(12) United States Patent
Wang et al.

(10) Patent No.: US 11,980,815 B2
(45) Date of Patent: May 14, 2024

(54) ACTION GENERATION METHOD, ELECTRONIC DEVICE, AND NON-TRANSITORY COMPUTER-READABLE MEDIUM

(71) Applicant: NETEASE (HANGZHOU) NETWORK CO., LTD., Zhejiang (CN)

(72) Inventors: Pengfei Wang, Zhejiang (CN); Yuyan Zou, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 249 days.

(21) Appl. No.: 17/606,464

(22) PCT Filed: Oct. 21, 2019

(86) PCT No.: PCT/CN2019/112332
§ 371 (c)(1),
(2) Date: Oct. 26, 2021

(87) PCT Pub. No.: WO2020/220602
PCT Pub. Date: Nov. 5, 2020

(65) Prior Publication Data
US 2022/0193550 A1  Jun. 23, 2022

(30) Foreign Application Priority Data
Apr. 30, 2019  (CN) .................. 201910364235.1

(51) Int. Cl.
A63F 13/56  (2014.01)
A63F 13/58  (2014.01)
A63F 13/822 (2014.01)

(52) U.S. Cl.
CPC .............. *A63F 13/56* (2014.09); *A63F 13/58* (2014.09); *A63F 13/822* (2014.09); *A63F 2300/65* (2013.01)

(58) Field of Classification Search
CPC .......... A63F 13/56; A63F 13/57; A63F 13/58; A63F 13/60; A63F 13/822; A63F 13/825
See application file for complete search history.

(56) References Cited

U.S. PATENT DOCUMENTS 6,626,759 B1 *  9/2003  Matsuoka ............... A63F 13/42
                                                463/31
7,148,894 B1 * 12/2006  Hayashi ................ A63F 13/426
                                                345/472

(Continued)

FOREIGN PATENT DOCUMENTS

CN  104606887 A  5/2015
CN  105976418 A  9/2016

(Continued)

OTHER PUBLICATIONS

CN-106984045-A. Machined Translation of Abstract. 2 Pages. (Year: 2017).*

(Continued)

*Primary Examiner* — Milap Shah
(74) *Attorney, Agent, or Firm* — Qinghong Xu

(57) ABSTRACT

An action generation method, electronic device, and a non-transitory computer-readable medium are disclosed. According to an embodiment, the method includes: detecting an attacked part of a virtual character after being attacked in a game scene; reading, from a preset form, motion parameters of a bone corresponding to the attacked part, wherein the motion parameter includes an angle range of the bone shaking and a coordinate axis to which the bone shaking refers; and loading the motion parameters, and (Continued)

controlling the motion of the bone of the virtual character according to the motion parameters to form an attacked action.

17 Claims, 3 Drawing Sheets

(56) References Cited

U.S. PATENT DOCUMENTS

| | | | | |
|---|---|---|---|---|
| 2003/0043154 | A1* | 3/2003 | Nimura | G06T 13/40 |
| | | | | 345/474 |
| 2004/0192424 | A1* | 9/2004 | Mori | A63F 13/577 |
| | | | | 463/8 |
| 2005/0202869 | A1* | 9/2005 | Miyamoto | A63F 13/2145 |
| | | | | 463/36 |
| 2006/0073898 | A1* | 4/2006 | Nakazawa | A63F 13/10 |
| | | | | 463/43 |
| 2006/0089197 | A1 | 4/2006 | Ajioka | |
| 2011/0244959 | A1* | 10/2011 | Inagaki | G06V 40/28 |
| | | | | 463/31 |
| 2014/0274373 | A1* | 9/2014 | Olshan | A63F 13/65 |
| | | | | 463/31 |

FOREIGN PATENT DOCUMENTS

| | | | | |
|---|---|---|---|---|
| CN | 106215419 | A * | 12/2016 | ........... A63F 13/355 |
| CN | 106215419 | A | 12/2016 | |
| CN | 106960475 | A | 7/2017 | |
| CN | 108295471 | A | 7/2018 | |
| CN | 108510582 | A | 9/2018 | |
| CN | 109464804 | A | 3/2019 | |
| CN | 110075523 | A | 8/2019 | |
| JP | 2002352275 | A * | 12/2002 | |
| JP | 4301471 | B2 * | 7/2009 | ............. A63F 13/10 |
| JP | 6549301 | B1 * | 7/2019 | ............. A63F 13/56 |
| KR | 20100116251 | A * | 11/2010 | |

OTHER PUBLICATIONS

CN-111467804-A. Machined Translation of Abstract. 2 Pages. (Year: 2020).*

* cited by examiner

ACTION GENERATION METHOD, ELECTRONIC DEVICE, AND NON-TRANSITORY COMPUTER-READABLE MEDIUM

CROSS-REFERENCE TO RELATED APPLICATIONS

The present application claims the priority of Chinese Patent Application No. 201910364235.1, filed on Apr. 30, 2019 to the State Intellectual Property Office of China and entitled "Action Generation Method and Apparatus, Electronic Device, and Computer-Readable Medium", the disclosure of which is hereby incorporated by reference in its entirety.

TECHNICAL FIELD

Embodiments of this application relate to the technical field of computers, and more particularly, to an action generation method, an electronic device, and a non-transitory computer-readable medium.

BACKGROUND

In a game scene, if a virtual character is attacked, it is usually necessary to generate an attacked action to present an effect after being attacked.

SUMMARY

According to an embodiment of this application provides an action generation method. The method may include that: an attacked part of a virtual character after being attacked in a game scene is detected; motion parameters of a bone corresponding to the attacked part is read from a preset form, the motion parameters including an angle range of the bone shaking and a coordinate axis to which the bone shaking refers; and the motion parameters is loaded, and the motion of the bone of the virtual character is controlled according to the motion parameters to form an attacked action.

According to another embodiment of this application provides an electronic device. The electronic device may include: one or more processors; and a storage apparatus, storing one or more programs thereon, when the one or more programs are executed by the one or more processors, the one or more processors being caused to implement at least one executable instruction, and the at least one executable instruction comprises:

detecting an attacked part of a virtual character after being attacked in a game scene;

reading, from a preset form, motion parameters of a bone corresponding to the attacked part, wherein the motion parameters comprising an angle range of the bone shaking and a coordinate axis to which the bone shaking refers; and loading the motion parameters, and controlling the motion of the bone of the virtual character according to the motion parameters to form an attacked action.

According to other embodiment of this application provides a non-transitory computer-readable storage medium, which may store a computer program that, when executed by a processor, implements at least one executable instruction, and the at least one executable instruction comprises:

detecting an attacked part of a virtual character after being attacked in a game scene;

reading, from a preset form, motion parameters of a bone corresponding to the attacked part, wherein the motion parameters comprising an angle range of the bone shaking and a coordinate axis to which the bone shaking refers; and loading the motion parameters, and controlling the motion of the bone of the virtual character according to the motion parameters to form an attacked action.

BRIEF DESCRIPTION OF THE DRAWINGS

Other features, objects, and advantages of this application will become more apparent by reading the detailed description of the non-limiting embodiments with reference to the following drawings.

DETAILED DESCRIPTION OF THE EMBODIMENTS

Figure 1:
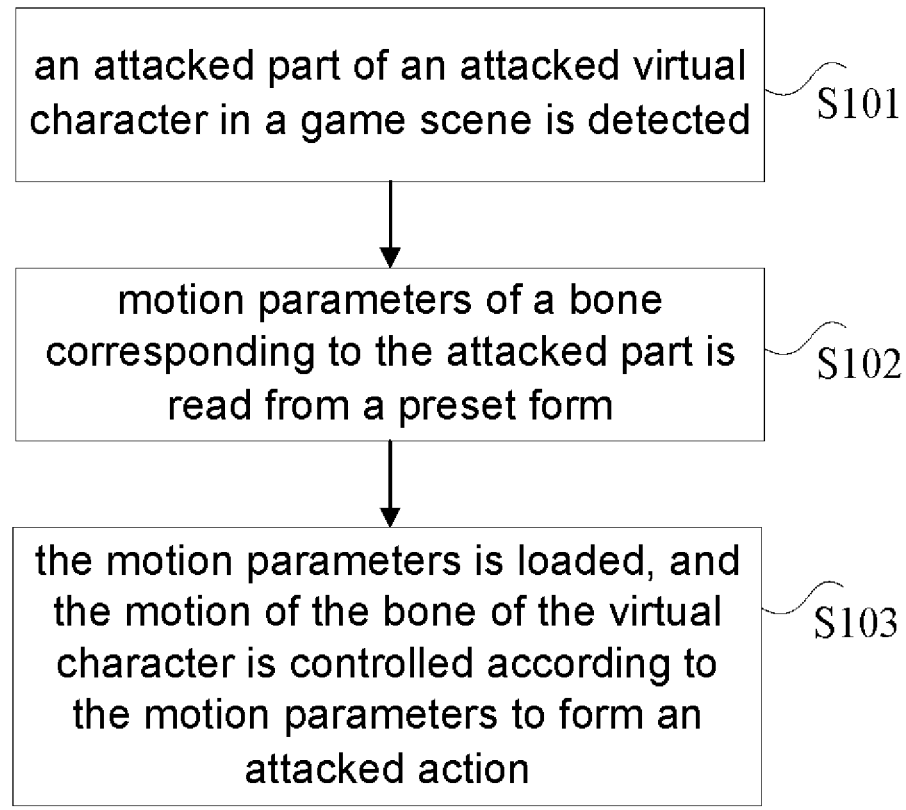
FIG. 1 illustrates a flowchart of an embodiment of an action generation method according to this application.

In related skills, usually when designing basic actions of the virtual character, one or more attacked actions are designed, and one of the attacked actions is presented after the virtual character is attacked. However, since the attack needs to show different attacked actions in different situations, this mode needs to make a large number of attacked actions in advance, resulting in a large amount of resource usage.

The present application will be further described in detail below with reference to the accompanying drawings and embodiments. It will be appreciated that the specific embodiments described herein are merely illustrative of the related invention and are not intended to limit this invention. In addition, it is also to be noted that, for the convenience of description, parts only related to the related invention are shown in the drawings.

It is to be noted that in the case of no conflict, the features in the embodiments and the embodiments in this application may be combined with each other. The present application is described below with reference to the drawings and in conjunction with the embodiments in detail.

Reference is made to FIG. 1, which shows a flow 100 of an embodiment of an action generation method according to this application. The action generation method includes the following steps.

At step 101, an attacked part of an attacked virtual character in a game scene is detected.

In the present embodiment, an execution subject (for example, an electronic device such as a laptop or a desktop) of the action generation method may be installed with a game application. A user can use the above execution subject for game experience.

In a game scene, multiple virtual characters may usually be displayed, and the multiple virtual characters may attack each other. The execution subject may record motion datas (such as orientation, attack angle and distance) of each virtual character. When a virtual character is detected as being attacked, by calculating action datas of the virtual character (such as orientation and angle) and action datas of an attacker (such as angle, orientation and attack angle), an attacked part of the attacked virtual character may be determined.

At step 102, motion parameters of a bone corresponding to the attacked part is read from a preset form, the motion parameters including an angle range of the bone shaking and a coordinate axis to which the bone shaking refers.

In the present embodiment, each virtual character may have a corresponding model. Each model may include multiple bones. The above execution subject may determine the bone where the attacked part is located or the bone closest to the attacked part, thereby determining the bone corresponding to the attacked part. It should be noted that the bone corresponding to the attacked part may be one or multiple. In addition, the above execution subject may store a form (for example, an excel form, etc.) set and filled in advance by a technician. The above form may store motion parameters of multiple bones of multiple virtual characters. After the execution subject determines a bone corresponding to the attacked part, a motion parameter of the bone may be read from the preset form.

As an example, each virtual character may correspond to a row in the above form. Each virtual character may have a different identifier (for example, it may be represented by a character string such as a number and a name). The execution subject may first look up an identifier of a currently attacked virtual character from the preset form, thereby determining a row corresponding to the virtual character. Then, from the determined row, a motion parameter of a bone corresponding to the attacked part may be found.

Here, the motion parameter may be a parameter for indicating a motion of the bone. For example, it may include, but is not limited to, an angle range of bone shaking and a coordinate axis to which bone shaking refers. Through the above angle range and the above coordinate axis, a rotation direction and angle of bone motion of the virtual character may be controlled.

Optionally, the motion parameters may further include other information, for example, may include, but not limited to, at least one of the following: a duration of the bone shaking and an interval time of the bone shaking. Here, a total duration of bone motion of the virtual character may be controlled based on the duration of the bone shaking, and an interval duration between two consecutive shakes of the bone may be controlled based on the interval time of bone shaking. Therefore, the motion of the bone of the virtual character may be controlled based on various motion parameters, thereby helping to present a vivid and natural attack effect.

Optionally, in addition to recording the motion parameters of multiple bones of multiple virtual characters in the above form, any one or more of the following may be recorded: the type number of each virtual character in the multiple virtual characters (for example, the type number "12" indicates that the type of the virtual character is bear, and the type number "13" indicates that the type of the virtual character is wolf), the name of each virtual character, a path where the model of the virtual character is located, the role number of the virtual character, and remark information, etc.

Further, the form further records a first angle range correction coefficient when the virtual character is attacked by a specified attack tool. Before loading the motion parameter, the method further includes the following steps.

It is determined whether an attack tool that attacks the virtual character is the specified attack tool.

When determining that the attack tool that attacks the virtual character is the specified attack tool, the angle range of bone shaking is updated to a product of the angle range of the bone shaking and the first angle range correction coefficient.

Further, the form further records a first duration correction coefficient when the virtual character is attacked by a specified attack tool. Before loading the motion parameter, the method further includes the following steps.

It is determined whether an attack tool that attacks the virtual character is the specified attack tool.

When determining that the attack tool that attacks the virtual character is the specified attack tool, the duration of the bone shaking is updated to a product of the duration of bone shaking and the first duration correction coefficient.

It is to be noted that for a certain virtual character, when different virtual attack tools are used to attack the virtual character, the degree of attack is usually different. Therefore, different actions can be presented to be closer to a real scene. Therefore, in some optional implementation manners of the present embodiment, a specified attack tool may be set for each virtual character in advance, so as to generate different degrees of attacked actions. Here, the preset form may further record a first angle range correction coefficient and/or a first duration correction coefficient when each virtual character is attacked by a specified attack tool. The first angle range correction coefficient may be used to correct the angle range when the virtual character is attacked by the specified attack tool. The first duration correction coefficient may be used to correct the duration when the virtual character is attacked by the specified attack tool.

In some optional implementation manners of the present embodiment, the execution subject may determine whether an attack tool that attacks the attacked virtual character is a specified attack tool. If yes, the angle range may be updated to a product of a current angle range and the first angle range correction coefficient, and/or the duration may be updated to a product of a current duration and the first duration correction coefficient, so that the read motion parameter is updated.

Further, the form further records a second angle range correction coefficient when the virtual character is attacked at a short distance or a long distance. Before loading the motion parameter, the method further includes the following steps.

It is determined whether an attacked distance of the virtual character is smaller than a first preset threshold, or whether an attacked distance is greater than a second preset threshold.

If the attacked distance is smaller than the first preset threshold or the attacked distance is greater than the second preset threshold, the angle range of bone shaking is updated to a product of the angle range of bone shaking and the second angle range correction coefficient.

In addition, it is to be noted that for a certain virtual character, when the virtual character is attacked at different distances, the degree of attack is usually different. Therefore, different actions can be presented to be closer to a real scene. Therefore, in some optional implementation manners of the present embodiment, the preset form may further record a second angle range correction coefficient and/or a second duration correction coefficient when each virtual character is attacked at a short distance or a long distance. The second angle range correction coefficient may be used to correct the angle range when the virtual character is attacked at a short distance or a long distance. The second duration correction coefficient may be used to correct the duration when the virtual character is attacked at a short distance or a long distance.

In some optional implementation manners of the present embodiment, the execution subject may determine whether an attacked distance of the virtual character is smaller than a first preset threshold, or determine whether an attacked distance of the virtual character is greater than a first preset threshold. If it is determined that the attacked distance of the virtual character is smaller than the first preset threshold, the virtual character may be determined to be attacked at a short distance. At this time, the angle range may be updated to a product of a current angle range and the second angle range correction coefficient, and/or the duration may be updated to a product of a current duration and the second duration correction coefficient. Similarly, if it is determined that the attacked distance of the virtual character is greater than a second preset threshold, the virtual character may be determined to be attacked at a long distance. At this time, the angle range may be updated to a product of a current angle range and the second angle range correction coefficient, and/or the duration may be updated to a product of a current duration and the second duration correction coefficient.

It is to be noted that the second angle range correction coefficient may be different between a short-range attack and a long-range attack, and the second duration correction coefficient may be different between a short-range attack and a long-range attack.

At step 103, the motion parameters is loaded, and the motion of the bone of the virtual character is controlled according to the motion parameters to form an attacked action.

In the present embodiment, the execution subject may load the motion parameters in the form, and control the motion of the bone of the virtual character according to the motion parameters to form an attacked action. Here, the attacked action may be an action generated based on the motion parameters.

Specifically, the motion parameters may include an angle range of bone shaking and a coordinate axis to which bone shaking refers. Therefore, after the execution subject loads the angle range and the coordinate axis, the bone may be first controlled to randomly shake within the shake range along the coordinate axis to generate the attacked action.

In some optional implementation manners of the present embodiment, the above form may further record an identifier for indicating whether the virtual character shakes after being attacked during a death calculation period. The death calculation period is a preset duration from the moment of death of the virtual character. At this time, the execution subject may determine whether the virtual character dies (for example, if the number of times of being attacked reaches a preset number, the virtual character may be considered to be dead). In response to determining that the virtual character is dead, the above identifier in the form may be read. In response to determining that the identifier indicates that the virtual character does not shake after being attacked during the death calculation period (for example, the identifier is "1"), the attacked action may be stopped.

It is to be noted that in the above implementation manner, in response to determining that the identifier indicates that the virtual character shakes after being attacked during the death calculation period, the attacked action may be continuously presented after detecting that the virtual character is attacked during the death calculation period. In practice, heavy virtual characters (such as virtual characters with a volume larger than a preset value) or protagonists (that is, virtual characters controlled by users) may not present the existing attacked action after being attacked during the death calculation period, and other virtual characters may present the existing attacked action after being attacked during the death calculation period.

According to the method provided by the embodiments of this application, an attacked part of an attacked virtual character in a game scene is detected; a motion parameter of a bone corresponding to the attacked part is read from a preset form; and finally, the motion parameter is loaded, and the motion of the bone of the virtual character is controlled according to the motion parameter to form an attacked action. In the embodiments of this application, different bones may be controlled to move within a preset angle range of a reference coordinate system according to the attacked part, so that multiple sets of attacked actions may be generated by reading the motion parameter in the form without the need to make and store a large number of attacked actions in advance, thereby saving resources and enriching the performance of being attacked in a game.

In addition, technicians can set motion parameters of different virtual characters when they are attacked at different bones only by filling in forms, which reduces labor costs.

In addition, since a large number of attacked actions are not required to be made and stored in advance, under the condition of certain computing resources, the attacked actions in the game scene can be enriched, and the action performance effect is improved.

At the same time, since the attacked action is only generated at the bone corresponding to the attacked part, the virtual character can not only show the response after the attack, but also not affect other behaviors of the virtual character. For example, when a monster is attacked during running, angle treatment may be performed on abdominal bones, chest bones, and head bones, but other basic actions of the monster will not be affected. As a result, the attack effect is presented more vividly and naturally, thereby improving the game experience.

Figure 2:
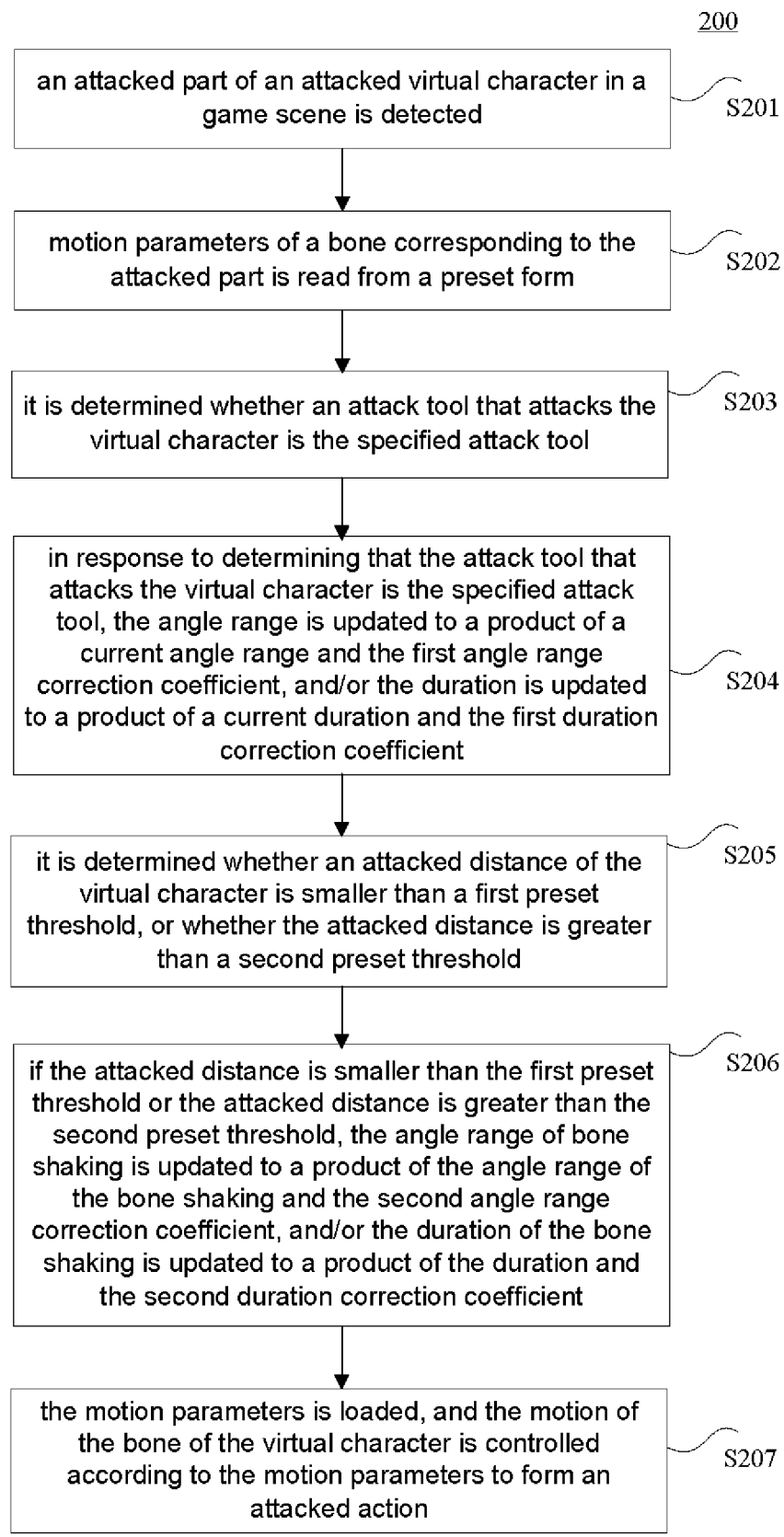
FIG. 2 illustrates a flowchart of another embodiment of an action generation method according to this application.

Further reference is made to FIG. 2, which shows a flow 200 of another embodiment of an action generation method. The flow 200 of the action generation method includes the following steps.

At step 201, an attacked part of an attacked virtual character in a game scene is detected.

In the present embodiment, an execution subject (for example, an electronic device such as a laptop or a desktop) of the action generation method detects an attacked part of an attacked virtual character in a game scene.

At step 202, motion parameters of a bone corresponding to the attacked part is read from a preset form.

In the present embodiment, each virtual character may have a corresponding model. Each model may include multiple bones. The above execution subject may determine the bone where the attacked part is located or the bone closest to the attacked part, thereby determining the bone corresponding to the attacked part. The above execution subject may store a form set and filled in advance by a technician. The above form may store motion parameters of multiple bones of multiple virtual characters. After the execution subject determines a bone corresponding to the attacked part, motion parameters of the bone may be read from the preset form. Here, the motion parameters may include the angle range of the bone shaking, a duration of the bone shaking, an interval time of the bone shaking, a coordinate axis to which bone shaking refers, and the like. In addition, the form further includes, but is not limited to, at least one of the following: the type number of the virtual character, the name of the virtual character, and a path where a model of the virtual character is located.

As an example, the preset form may be shown in Table 1 below:

TABLE 1

| Type Number | Number | Duration | Interval Time | Bone Name | Angle Range | Coordinate axis | Bone Name | Angle Range | Coordinate Axis |
|---|---|---|---|---|---|---|---|---|---|
| 12 | Bear | 0.15 | 0.1 | Spine | 15, 30 |   | Head | 40, 50 | Z |
| 13 | Wolf | 0.2 | 0.1 | Spine | 5, 8 | X | Head | 10, 20 | Z |

In Table 1 of the above example, "Spine" in the "Bone Name" column may represent a spine bone, and "Head" may represent a head bone. The two values in each row in the "Angle Range" column are used to indicate the range of angles at which the bone is shaking. For example, when the angle range is "15, 30", it indicates that the angle range of bone shaking is between 15 and 30 degrees. If "Coordinate Axis" is not filled in, it may indicate random rotation.

It is to be noted that for a certain virtual character, when different virtual attack tools are used to attack the virtual character, the degree of attack is usually different. Therefore, different actions can be presented to be closer to a real scene. Therefore, a specified attack tool may be set for each virtual character in advance, so as to generate different degrees of attacked actions. Here, the preset form may further record a first angle range correction coefficient and/or a first duration correction coefficient when each virtual character is attacked by a specified attack tool. For example, the preset form may also include the content shown in Table 2 below:

TABLE 2

| Specified Attack Tool | First Angle Range Correction Coefficient | First Duration Correction Coefficient |
|---|---|---|
| 1001 1002 1003 | 1.5 0.2 1.5 | 1.8 0.5 2.0 |

In Table 2, "1001", "1002", and "1003" in the "Specified Attack Tool" column may indicate different specified attack tools. When a virtual character has multiple specified attack tools, they may be separated by spaces in the form, for example, in Table 2: "1001 1002".

Similarly, when a virtual character has multiple specified attack tools, different specified attack tools may correspond to different first angle range correction coefficients and different first duration correction coefficients. At this time, the first angle range correction coefficients corresponding to the specified attack tools may be separated by spaces. The first duration correction coefficients corresponding to the specified attack tools may also be separated by spaces. As shown in Table 2, the order of the values in the "First Angle Range Correction Coefficient" column and the "First Duration Correction Coefficient" column corresponds to the order of the specified attack tools. For the specified attack tool "1001", the corresponding first angle range correction coefficient is "1.5", and the corresponding first duration correction coefficient is "1.8". For the specified attack tool "1002", the corresponding first angle range correction coefficient is "0.2", and the corresponding first duration correction coefficient is "0.5".

It is to be noted that the first angle range correction coefficient may be used to correct the angle range when the virtual character is attacked by the specified attack tool. The first duration correction coefficient may be used to correct the duration when the virtual character is attacked by the specified attack tool. It is to be noted that the form may also record information such as the name or number of the specified attack tool.

As an example, a heavy virtual character is usually less affected when attacked by a lightweight attack tool than when it is attacked by another attack tool. Therefore, the lightweight attack tool may be used as the specified attack tool for the heavy virtual character. At this time, the first angle range correction coefficient may be set to a number capable of reducing the angle range, and the first duration correction coefficient may be set to a number capable of reducing the duration.

As yet another example, a fire-resistant virtual character is generally not affected when attacked by an attack tool such as a flamethrower. Therefore, the attack tool such as the flamethrower may be used as the specified attack tool for the fire-resistant virtual character. At this time, the first angle range correction coefficient may be set to a number capable of correcting the angle range to 0, and the first duration correction coefficient may be set to a number capable of correcting the duration to 0.

It is to be noted that for a certain virtual character, when the virtual character is attacked at different distances, the degree of attack is usually different. Therefore, different actions can be presented to be closer to a real scene. Therefore, in the present embodiment, the preset form may further record a second angle range correction coefficient and/or a second duration correction coefficient when each virtual character is attacked at a short distance or a long distance. The second angle range correction coefficient may be used to correct the angle range when the virtual character is attacked at a short distance or a long distance. The second duration correction coefficient may be used to correct the duration when the virtual character is attacked at a short distance or a long distance. For example, the preset form may also include the content shown in Table 3 below:

TABLE 3

| Second Angle Range Correction Coefficient | Second Duration Correction Coefficient |
|---|---|
| 1.2 | 1.6 |
| 0.5 | 0.8 |

Because the virtual character usually has more obvious action and longer duration when being attacked at a short distance, the second angle range correction coefficient and the second duration correction coefficient may be set to a number greater than 1 when being attacked at a short distance. Similarly, because the virtual character usually has less obvious action and shorter duration when being attacked at a long distance, the second angle range correction coefficient and the second duration correction coefficient may be set to a number less than 1 when being attacked at a short distance. As shown in Table 3, "1.2" in the "Second Angle Range Correction Coefficient" column may represent a second angle range correction coefficient when a virtual character is attacked at a short distance; and "1.6" in the "Second Duration Correction Coefficient" column may represent a second duration correction coefficient when the virtual character is attacked at a short distance. "0.5" in the "Second Angle Range Correction Coefficient" column may represent a second angle range correction coefficient when another virtual character is attacked at a long distance; and "0.8" in the "Second Duration Correction Coefficient" column may represent a second duration correction coefficient when the virtual character is attacked at a long distance.

At step 203, it is determined whether an attack tool that attacks the virtual character is the specified attack tool.

In the present embodiment, the execution subject may record the attack tools used by each virtual character in the game scene in real time, and thus determine whether an attack tool that attacks the attacked virtual character is a specified attack tool.

At step 204, in response to determining that the attack tool that attacks the virtual character is the specified attack tool, the angle range is updated to a product of a current angle range and the first angle range correction coefficient, and/or the duration is updated to a product of a current duration and the first duration correction coefficient.

In the present embodiment, in response to determining that the attack tool that attacks the virtual character is the specified attack tool, the execution subject may update the angle range to a product of a current angle range and the first angle range correction coefficient, and/or update the duration to a product of a current duration and the first duration correction coefficient.

At step 205, it is determined whether an attacked distance of the virtual character is smaller than a first preset threshold, or whether the attacked distance is greater than a second preset threshold.

In the present embodiment, the execution subject may determine whether an attacked distance of the virtual character is smaller than a first preset threshold, or determine whether the attacked distance is greater than a second preset threshold. Here, the first preset threshold and the second preset threshold may be set in advance as needed, and specific values are not limited herein.

At step 206, if the attacked distance is smaller than the first preset threshold or the attacked distance is greater than the second preset threshold, the angle range of bone shaking is updated to a product of the angle range of bone shaking and the second angle range correction coefficient, and/or the duration of bone shaking is updated to a product of the duration and the second duration correction coefficient.

In the present embodiment, in response to determining that the attacked distance of the virtual character is smaller than the first preset threshold, the execution subject may determine that the virtual character is attacked at a short distance, and may update the angle range to the product of the angle range and the second angle range correction coefficient determined at step 204, and/or update the duration to the product of the duration and the second duration correction coefficient determined at step 204. Or, in response to determining that the attacked distance of the virtual character is greater than the second preset threshold, the execution subject may determine that the virtual character is attacked at a long distance, and may update the angle range to the product of the angle range and the second angle range correction coefficient determined at step 204, and/or update the duration to the product of the duration and the second duration correction coefficient determined at step 204.

It is to be noted that the second angle range correction coefficient during a short-distance attack and the second angle range correction coefficient during a long-range attack may be different. The second duration correction coefficient during a short-distance attack and the second duration correction coefficient during a long-range attack may be different.

At step 207, the motion parameters is loaded, and the motion of the bone of the virtual character is controlled according to the motion parameters to form an attacked action.

In the present embodiment, the execution subject may load the motion parameters in the form, load the above motion parameters, and control the motion of the bone of the virtual character according to the motion parameters to form an attacked action.

As can be seen from FIG. 2, compared with the embodiment corresponding to FIG. 1, the flow 200 of the action generation method in the present embodiment involves a step of correcting motion parameters. Therefore, the solution described in the present embodiment may correct the motion parameters for a specified attack tool and the motion parameters for a short-range attack, thereby further enriching the attacked action and presenting the attack effect more vividly and naturally.

Figure 3:
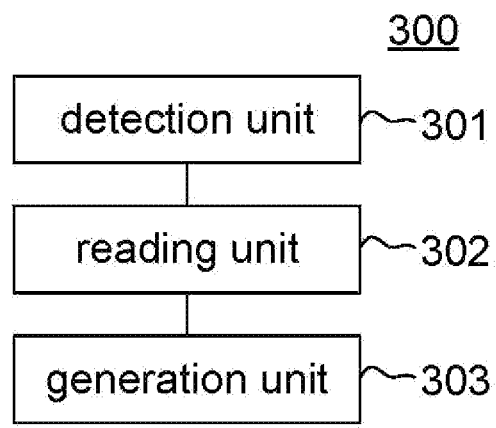
FIG. 3 illustrates a schematic structure diagram of an embodiment of an action generation apparatus according to this application.

With further reference to FIG. 3, as an implementation of the methods shown in the foregoing figures, this application provides an embodiment of an action generation apparatus. The apparatus embodiment corresponds to the method embodiment shown in FIG. 1, and the apparatus may be specifically applied to various electronic devices.

As shown in FIG. 3, an action generation apparatus 300 in the present embodiment includes: a detection unit 301, configured to detect an attacked part of an attacked virtual character in a game scene; a reading unit 302, configured to read, from a preset form, motion parameters of a bone corresponding to the attacked part, the motion parameters including an angle range of bone shaking and a coordinate axis to which bone shaking refers; and a generation unit 303, configured to load the motion parameters, and control the motion of the bone of the virtual character according to the motion parameters to form an attacked action.

In some optional implementation manners of the present embodiment, the motion parameters further includes at least one of the following: a duration of bone shaking and an interval time of bone shaking.

In some optional implementation manners of the present embodiment, the form further records a first angle range correction coefficient when the virtual character is attacked by a specified attack tool. The apparatus further includes: a first determination unit, configured to determine whether an attack tool that attacks the virtual character is the specified attack tool; and a first update unit, configured to update, if the attack tool that attacks the virtual character is the specified attack tool, the angle range of bone shaking to a product of the angle range of bone shaking and the first angle range correction coefficient.

In some optional implementation manners of the present embodiment, the form further records a first duration correction coefficient when the virtual character is attacked by a specified attack tool. The apparatus further includes: a second determination unit, configured to determine whether an attack tool that attacks the virtual character is the specified attack tool; and a second update unit, configured to update, if the attack tool that attacks the virtual character is the specified attack tool, the duration of bone shaking to a product of the duration of bone shaking and the first duration correction coefficient.

In some optional implementation manners of the present embodiment, the form further records a second angle range correction coefficient when the virtual character is attacked at a short distance or a long distance. The apparatus further includes: a third determination unit, configured to determine whether an attacked distance of the virtual character is smaller than a first preset threshold, or whether an attacked distance is greater than a second preset threshold; and a third update unit, configured to update, if the attacked distance is smaller than the first preset threshold or the attacked distance is greater than the second preset threshold, the angle range of bone shaking to a product of the angle range of bone shaking and the second angle range correction coefficient.

In some optional implementation manners of the present embodiment, the form further records a second duration correction coefficient when the virtual character is attacked at a short distance or a long distance. The apparatus further includes: a fourth determination unit, configured to determine whether an attacked distance of the virtual character is smaller than a first preset threshold, or whether an attacked distance is greater than a second preset threshold; and a fourth update unit, configured to update, if the attacked distance is smaller than the first preset threshold or the attacked distance is greater than the second preset threshold, the duration of bone shaking to a product of the duration and the second duration correction coefficient.

In some optional implementation manners of the present embodiment, the form further records an identifier for indicating whether a virtual character shakes after being attacked during a death calculation period, the death calculation period being a preset duration from the moment of death of the virtual character. The apparatus further includes: a fifth determination unit, configured to determine whether the virtual character dies; an identifier reading unit, configured to read, if the virtual character dies, the identifier in the form; and a stopping unit, configured to stop, in response to determining that the identifier indicates that the virtual character does not shake after being attacked during the death calculation period, the attacked action.

According to the apparatus provided by the above embodiments, an attacked part of an attacked virtual character in a game scene is detected; motion parameters of a bone corresponding to the attacked part is read from a preset form; and finally, the motion parameters is loaded, an attacked action of the virtual character at the bone is generated, and the attacked action is presented in the game scene, so that the attacked action may be generated by reading the motion parameters in the form without the need to make and store a large number of attacked actions in advance, thereby saving resources. In addition, technicians can set motion parameters of different virtual characters when they are attacked at different bones only by filling in forms, which reduces labor costs. In addition, since a large number of attacked actions are not required to be made and stored in advance, under the condition of certain computing resources, the attacked actions in the game scene can be enriched, and the action performance effect is improved. At the same time, since the attacked action is only generated at the bone corresponding to the attacked part, the virtual character can not only show the response after the attack, but also not affect other behaviors of the virtual character. As a result, the attack effect is presented more vividly and naturally.

Figure 4:
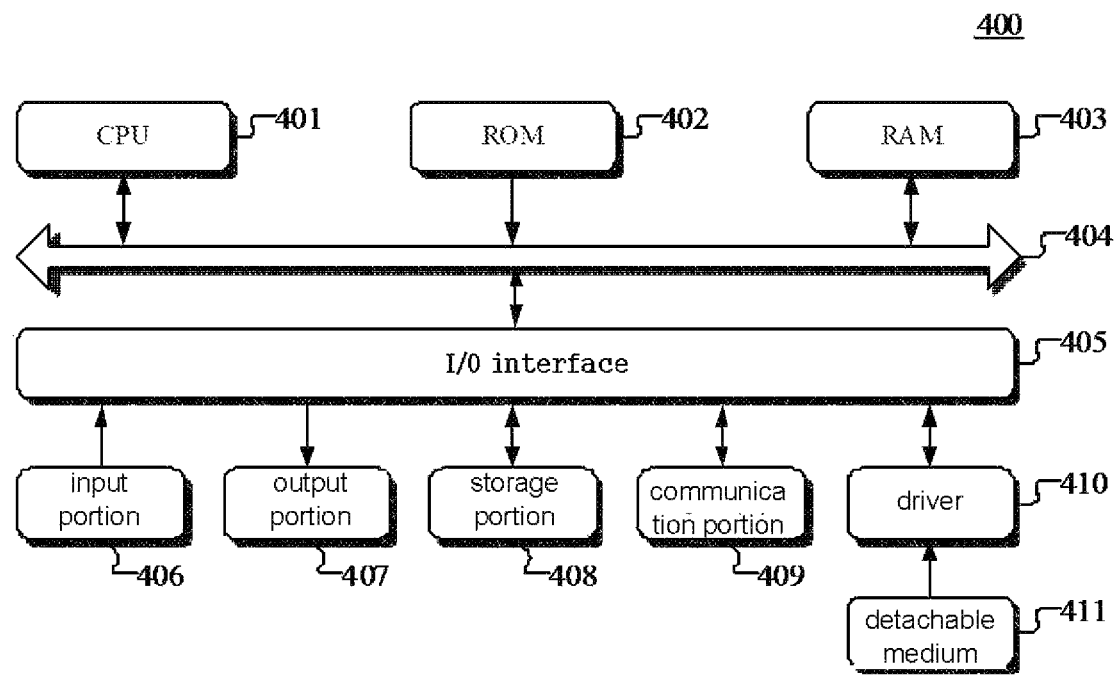
FIG. 4 illustrates a schematic structure diagram of a computer system suitable for implementing an electronic device according to an embodiment of this application.

Reference is now made to FIG. 4, which illustrates a schematic structure diagram of a computer system 400 suitable for implementing an electronic device according to an embodiment of this application. The electronic device shown in FIG. 4 is merely an example, and should not impose any limitation on the function and scope of use of the embodiments of this application.

As shown in FIG. 4, the computer system 400 includes a Central Processing Unit (CPU) 401, which may be loaded into a Random Access Memory (RAM) 403 according to a program stored in a Read-Only Memory (ROM) 402 or from a storage portion 408 to perform various appropriate actions and processes. In the RAM 403, various programs and data required for the operation of the system 400 are also stored. The CPU 401, the ROM 402, and the RAM 403 are connected to each other through a bus 404. An Input/output (I/O) interface 405 is also connected to the bus 404.

The following components are connected to the I/O interface 405: an input portion 406 including a keyboard, a mouse, and the like; an output portion 407 including a Liquid Crystal Display (LCD), a speaker, and the like; a storage portion 408 including a hard disk; and a communication portion 409 including a network interface card such as a Local Area Network (LAN) card, a modem, and the like. The communication portion 409 performs communication processing via a network such as the Internet. A driver 410 is also connected to the I/O interface 405 as needed. A detachable medium 411, such as a magnetic disk, an optical disk, a magneto-optical disk, and a semiconductor memory, is installed on the driver 410 as needed, so that a computer program read out therefrom is installed into the storage portion 408 as needed.

In particular, according to an embodiment of the present disclosure, the process described above with reference to the flowchart may be implemented as a computer software program. For example, an embodiment of the present disclosure includes a computer program product including a computer program carried on a non-transitory computer-readable medium, the computer program containing a program code for performing the method shown in the flowchart. In such an embodiment, the computer program may be downloaded and installed from a network through the communication portion 409, and/or installed from the detachable medium 411. When the computer program is executed by the CPU 401, the above functions defined in the method of this application are executed. It is to be noted that the non-transitory computer-readable medium of this application may be a computer-readable signal medium or a computer-readable storage medium or any combination of the foregoing. The computer-readable storage medium may be, for example, but not limited to, an electronic, magnetic, optical, electromagnetic, infrared, or semiconductor system, apparatus, or device, or any combination thereof. A more specific example of the computer-readable storage medium may include, but is not limited to: an electric connection portion with one or more wires, a portable computer disk, a hard disk, a RAM, a ROM, an Erasable Programmable ROM (EPROM) (or flash memory), an optical fiber, a portable CD-ROM, an optical storage device, a magnetic storage device, or any suitable combination of the foregoing. In this application, the computer-readable storage medium may be any tangible medium that contains or stores a program. The program may be used by or in combination with an instruction execution system, apparatus, or device. In this application, the computer-readable signal medium may include a data signal that is propagated in a baseband or as part of a carrier, carrying computer-readable program codes. Such propagated data signals may take a variety of forms including, but not limited to, electromagnetic signals, optical signals, or any suitable combination of the foregoing. The computer-readable signal medium may also be any computer-readable medium other than a computer-readable storage medium, and the non-transitory computer-readable medium may send, propagate, or transmit a program for use by or in connection with an instruction execution system, apparatus, or device. Program codes included in the non-transitory computer-readable medium may be transmitted by any suitable medium, including but not limited to wireless, wired, optical cable, RF, etc., or any suitable combination of the foregoing.

The flowchart and block diagram in the accompanying drawings illustrate the architecture, functionality, and operation of possible implementations of systems, methods and computer program products according to various embodiments of this application. In this regard, each block in the flowchart or block diagram may represent a module, a program segment, or a part of code, which contains one or more executable instructions for implementing a specified logical function. It should also be noted that in some alternative implementations, the functions noted in the blocks may also occur in a different order than those marked in the drawings. For example, two successively represented blocks may actually be executed substantially in parallel, and they may sometimes be executed in the reverse order, depending on the functions involved. It should also be noted that each block in the block diagrams and/or flowcharts, and combinations of blocks in the block diagrams and/or flowcharts may be implemented by a dedicated hardware-based system that performs specified functions or operations, or may be implemented with a combination of dedicated hardware and computer instructions.

The units described in the embodiments of this application may be implemented by software or hardware. The described units may also be provided in a processor. The names of the units do not, in some cases, define the units themselves.

As another aspect, this application also provides a non-transitory computer-readable medium, which may be included in the apparatus described in the above embodiments; or may exist alone without being assembled into the apparatus. The non-transitory computer-readable medium carries one or more programs. When the one or more programs are executed by the apparatus, the apparatus is caused to: detect an attacked part of an attacked virtual character in a game scene; read, from a preset form, motion parameters of a bone corresponding to the attacked part; and load the motion parameters in the form, generate an attacked action of the virtual character at the bone, and present the attacked action in the game scene.

The above description is only a preferred embodiment of the application and an explanation of the applied technical principles. Those skilled in the art should understand that the scope of the invention involved in this application is not limited to the technical solution of a specific combination of the above technical features. Moreover, it should also cover other technical solutions formed by arbitrarily combining the above technical features or their equivalent features without departing from the above inventive concept. For example, the technical solutions are technical solutions formed by replacing the above features with technical features disclosed in this application (but not limited to) having similar functions.

What is claimed is:

1. An action generation method, wherein
the action generation method is performed by an electronic device with a game application installed, and comprises:
in response to determining that a virtual character in a game scene of the game application is attacked by an attacker, acquiring an attacked part of the virtual character by calculating a first action data of the virtual character and a second action data of the attacker, wherein the first action data of the virtual character comprises data about a first action of the virtual character, and the second action data of the attacker comprises data about a second action of the attacker;
reading, from a preset form stored, motion parameters of a bone corresponding to the attacked part, wherein the motion parameters comprise an angle range within which the bone is shaking and a coordinate axis along which the bone is shaking; and
loading the motion parameters, and controlling the bone of the virtual character to shake within the angle range along the coordinate axis to generate an attacked action.

2. The action generation method as claimed in claim 1, wherein the motion parameters further comprise at least one of the following: a duration of the bone shaking and an interval time of the bone shaking.

3. The action generation method as claimed in claim 2, wherein the preset form further records a first duration correction coefficient when the virtual character is attacked by a specified attack tool, and before loading the motion parameters, the method further comprises:
determining whether an attack tool that attacks the virtual character is the specified attack tool; and
when determining that the attack tool that attacks the virtual character is the specified attack tool, updating the duration of the bone shaking to a product of the duration of the bone shaking and the first duration correction coefficient.

4. The action generation method as claimed in claim 2 wherein the preset form further records a second duration correction coefficient when the virtual character is attacked at a short distance or a long distance, and before loading the motion parameters, the method further comprises:
determining whether an attacked distance of the virtual character is smaller than a first preset threshold, or whether the attacked distance is greater than a second preset threshold; and
when the attacked distance is smaller than the first preset threshold or the attacked distance is greater than the second preset threshold, updating the duration of the bone shaking to a product of the duration and the second duration correction coefficient.

5. The action generation method as claimed in claim 1, wherein the preset form further records a first angle range correction coefficient when the virtual character is attacked by a specified attack tool, and before loading the motion parameters, the method further comprises:
determining whether an attack tool that attacks the virtual character is the specified attack tool; and
when determining that the attack tool that attacks the virtual character is the specified attack tool, updating the angle range of the bone shaking to a product of the angle range of the bone shaking and the first angle range correction coefficient.

6. The method as claimed in claim 5, wherein before determining whether an attack tool that attacks the virtual character is the specified attack tool, the method further comprises:
a specified attack tool is set for each virtual character in advance, to generate different degrees of attack actions.

7. The action generation method as claimed in claim 1, wherein the preset form further records a second angle range correction coefficient when the virtual character is attacked at a short distance or a long distance, and before loading the motion parameters, the method further comprises:
  determining whether an attacked distance of the virtual character is smaller than a first preset threshold, or whether the attacked distance is greater than a second preset threshold; and
  when the attacked distance is smaller than the first preset threshold or the attacked distance is greater than the second preset threshold, updating the angle range of the bone shaking to a product of the angle range of the bone shaking and the second angle range correction coefficient.

8. The action generation method as claimed in claim 1, wherein the preset form further records an identifier for indicating whether the virtual character shakes after being attacked during a death calculation period, the death calculation period being a preset duration from the moment of death a death moment of the virtual character; and
  the method further comprises:
  determining whether the virtual character dies;
  when determining that the virtual character dies, reading the identifier from the preset form; and
  in response to determining that the identifier indicates that the virtual character does not shake after being attacked during the death calculation period, stopping the attacked action.

9. The method as claimed in claim 8, wherein determining whether the virtual character dies, comprises:
  determining whether a number of attacks reaches a preset number;
  determining that the virtual character dies, when the number of the times of being attacked reaches the preset number.

10. The method as claimed in claim 8, wherein the method further comprises:
  in response to determining that the identifier indicates that the virtual character shakes after being attacked during the death calculation period, continue executing the attack action.

11. The method as claimed in claim 1, wherein the virtual character has a model, the model includes multiple bones.

12. The method as claimed in claim 1, wherein the motion parameters indicate a motion of the bone.

13. The method as claimed in claim 12, wherein a rotation direction and angle of bone motion of the virtual character are controlled, according to the angle range of the bone shaking and the coordinate axis to which the bone shaking refers are used to control.

14. The method as claimed in claim 1, wherein
  the first action data of the virtual character comprises at least one of orientation or angle about the first action of the virtual character.

15. The method as claimed in claim 1, wherein
  the second action data of the attacker comprises at least one of orientation, angle, or attack angle about the second action of the attacker.

16. An electronic device, comprising:
  one or more processors; and
  a storage apparatus, storing one or more programs thereon, wherein
  the electronic device has a game application installed, and when the one or more programs are executed by the one or more processors, the one or more processors being caused to implement at least one executable instruction, and the at least one executable instruction comprises:
  in response to determining that a virtual character in a game scene of the game application is attacked by an attacker, acquiring an attacked part of the virtual character by calculating a first action data of the virtual character and a second action data of the attacker, wherein the first action data of the virtual character comprises data about a first action of the virtual character, and the second action data of the attacker comprises data about a second action of the attacker;
  reading, from a preset form stored, motion parameters of a bone corresponding to the attacked part, wherein the motion parameters comprise an angle range within which the bone is shaking and a coordinate axis along which the bone is shaking; and
  loading the motion parameters, and controlling the bone of the virtual character to shake within the angle range along the coordinate axis to generate an attacked action.

17. A non-transitory computer-readable medium, storing a computer program that, when executed by a processor, implements at least one executable instruction, and the at least one executable instruction comprises:
  in response to determining that a virtual character in a game scene of the game application is attacked by an attacker, acquiring an attacked part of the virtual character by calculating a first action data of the virtual character and a second action data of the attacker, wherein the first action data of the virtual character comprises data about a first action of the virtual character, and the second action data of the attacker comprises data about a second action of the attacker;
  reading, from a preset form stored, motion parameters of a bone corresponding to the attacked part, wherein the motion parameters comprise an angle range within which the bone is shaking and a coordinate axis along which the bone is shaking; and
  loading the motion parameters, and controlling the bone of the virtual character to shake within the angle range along the coordinate axis to generate an attacked action.

\* \* \* \* \*